Figure 1:
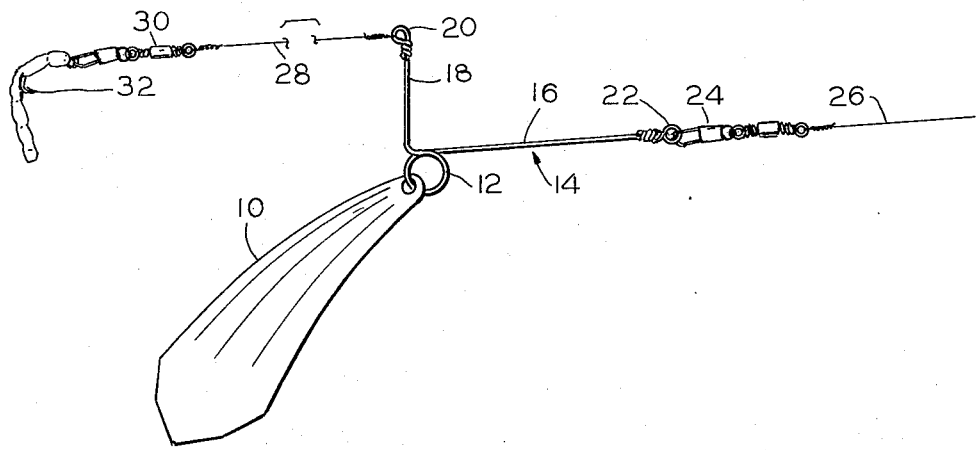

United States Patent [19]

Erving

[11] 3,943,651

[45] Mar. 16, 1976

[54] OFFSET SPINNER

[76] Inventor: Eric Robert Erving, 1313 Church St., Baker, Oreg. 97814

[22] Filed: June 13, 1975

[21] Appl. No.: 586,524

[52] U.S. Cl. ............... 43/42.19; 43/42.11; 43/42.13
[51] Int. Cl.² ............................................ A01K 85/00
[58] Field of Search ............ 43/42.11, 42.12, 42.13, 43/42.14, 42.19, 42.2, 42.16, 42.17, 42.51

[56] References Cited
UNITED STATES PATENTS

| | | | |
|---|---|---|---|
| 2,266,234 | 12/1941 | Mitchell | 43/42.13 |
| 2,823,484 | 2/1958 | Bousquet | 43/42.19 |
| 3,012,356 | 12/1961 | Tyson | 43/42.11 |

Primary Examiner—Warner H. Camp
Attorney, Agent, or Firm—Klarquist, Sparkman, Campbell, Leigh, Hall & Whinston

[57] ABSTRACT

A clevis revolved about the axis of a core wire by a spinner blade secured to one arm of the clevis carries a lead line on an opposite arm so that the lead line and a lure or bait carried thereby is revolved. In one embodiment, the clevis is integral with and formed from the core wire, and in a second embodiment the clevis is separate from and swivelled on the core wire.

7 Claims, 2 Drawing Figures

OFFSET SPINNER

DESCRIPTION

This invention relates to an offset spinner, and has for an object thereof the provision of an offset spinner.

Another object of the invention is to provide a fishing lure having a hook attached to a line secured to one end of a lever revolved around a core wire by a spinner blade.

A further object of the invention is to provide a fishing lure having a swivelled core wire having an eye formed at one end with an offsetting arm adjacent thereto projecting transversely to the body, a line with a hook thereon secured to the offset arm and a spinner blade secured to the eye.

Another object of the invention is to provide a fishing lure having a clevis rotatable by a spinner blade on a core wire and an offsetting arm to which a hook carrying leader is secured.

Figure 2:
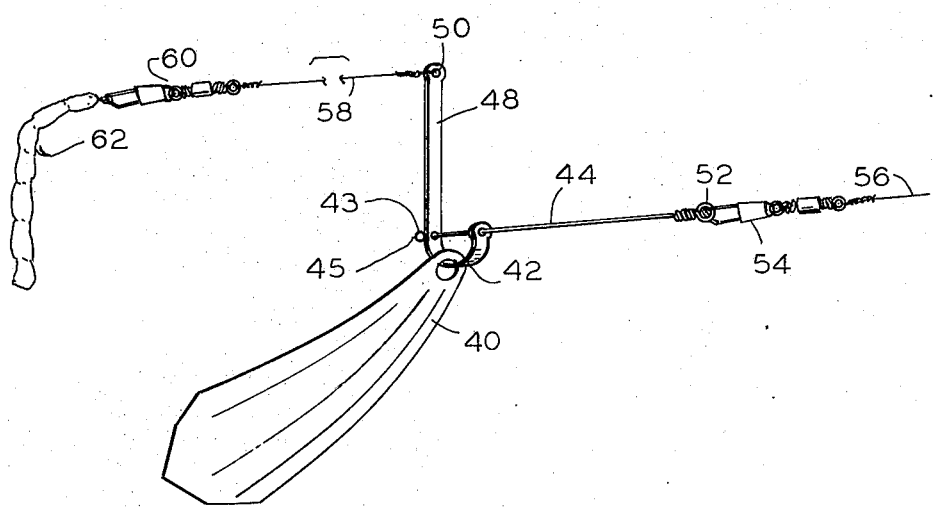

In the drawings:

FIG. 1 is a perspective view of an offset spinner forming one embodiment of the invention; and FIG. 2 is a perspective view of an offset spinner forming an alternate embodiment of the invention.

Referring now in detail to the drawings, there is shown in FIG. 1 an offset spinner forming a specific embodiment of the invention and including a spinner blade 10 secured to a split ring or clevis portion 12 of a stiff spring core wire 14 having a body 16, an offset arm 18 provided with an eye portion 20 and an eye portion 22 adapted, as shown, to be secured to a snap swivel 24 on the end of a fishing line 26 leading to a fishing pole and a reel (not shown). A short leader 28 carrying a snap swivel 30 is secured to the eye portion 20, and a baited hook 32 or a small spinner or a wobbler is secured to the free end of the leader, the leader being several times as long as the offsetting arm 18, being ten inches or so long in one very successful embodiment. The split ring 12 is offset from the axis of the body 16 and, when the lure is pulled through the water, the blade revolves the core wire 14 to revolve the leader and hook about the axis of the body 16 with a twitching action very attractive to fish.

Embodiment of Fig. 2

An offset spinner forming an alternate embodiment of the invention includes a stiff core wire 44 on which is rotatably mounted a strap-like clevis 42 bearing against a bearing bead 43 on the wire 44 which has an enlarged end 45 retaining the bead thereon. A spinner blade 40 is secured in the usual fashion to the clevis, and a long, offsetting arm 48 of the clevis has an eye portion 50 at its free end to which is secured a leader 58. The leader carries a snap swivel 60 at its lower end, and a hook 62 or a spinner, wobbler or other lure may be substituted for the hook, if desired. The upper end of the core wire 44 has any eye 52 for securing the lure to a snap swivel 54 secured to the end of a fishing line 56. When the lure is pulled through the water, the blade revolves around the core wire and revolves the clevis, which revolves the leader and the terminal lure thereon. This also produces a fish-catching twitching action.

If desired, colored beads with or without a swivelled blade may be mounted on the core wires 14 and 44 as further attractions. The blades 10 and 40 are somewhat cupped as is common with spinners and are shown with the concave portion of the blade 10 facing outwardly, and the concave portion of the blade 40 facing inwardly. The blades may be reversed from these directions of facing if desired.

What is claimed is:

1. In an offset spinner,
core wire means having a longitudinal axis,
clevis means connected to the core wire means,
a spinner blade connected to the clevis means at a point offset from said axis for revolving the clevis means around said axis,
a leader,
and offsetting arm means connected to the clevis means and revolved thereby and carrying the leader at the outer end of the arm means.

2. The offset spinner of claim 1 wherein the core wire means, the clevis means and the arm means are integral.

3. The offset spinner of claim 2 wherein the core wire means, the clevis means and the arm means are a single stiff wire.

4. The offset spinner of claim 3 wherein the wire has a coiled, offset split ring portion forming the clevis means.

5. The offset spinner of claim 4 wherein the wire has eye portions at each end thereof.

6. The offset spinner of claim 1 wherein the clevis means and the offsetting arm means are a single strap having a U-shaped clevis portion rotatable on the core wire means and an elongated arm forming the arm means.

7. The offset spinner of claim 6 including a bearing bead on the core wire means against which the strap bears.

* * * * *